UNITED STATES PATENT OFFICE.

LÉON CUISINIER, OF PARIS, FRANCE.

METHOD OF MANUFACTURING MALTOSE.

SPECIFICATION forming part of Letters Patent No. 311,417, dated January 27, 1885.

Application filed August 23, 1883. (No specimens.)

*To all whom it may concern:*

Be it known that I, LÉON CUISINIER, a citizen of the French Republic, and a resident of Paris, France, have invented certain Improvements in the Industrial Manufacture of Maltose, of which the following is a specification.

My invention is an improvement on the methods of manufacturing maltose described in the English patent of Dubrunfaut and Southey. "Maltase" is the name given by Dubrunfaut to the sugar resulting from the saccharification of amylaceous substances by diastase, which is the active principle and saccharifient developed in grain at the moment of its germination. When diastase acts upon starch as a saccharifient, not only is maltose produced, but, according to the period taken in the reaction, we find in the wort various proportions of the following-named substances: first, soluble starch; second, dextrine; third, maltose; fourth, dextrose; finally, the soluble starch disappears and there remain only dextrine, maltose, and dextrose, the maltose predominating.

The active principle of germinating grain, which chemists usually include under the generic name of "diastase," has been resolved by Dubrunfaut into two substances, which he calls "maltase" and "dextrimase." Maltase, which is characterized by the feebleness of its power to liquefy cooked starch and its strong saccharifient power, is destroyed rapidly above a temperature of 50° centigrade. Dextrimase, which is characterized by opposite powers— viz., strong liquefying power and feeble saccharifient power—is destroyed only by temperatures above 80° centigrade.

The above sets forth the general chemical principles upon which maltose is produced by the action of diastase upon starch.

Starch or fecula, when diluted with water and heated up to a temperature of 67° centigrade, is converted into starch-paste. This paste, when subjected to the influence of an infusion of malt up to a temperature of 80° centigrade, is liquefied. This liquefaction is effected most readily at temperatures comprised between 75° and 80° centigrade. At lower temperatures it proceeds more slowly. If before heating a mixture of fecula and water up to 75° we add a proper proportion of the infusion and mix intimately, we may raise the temperature slowly to 80° without any appearance of thickening or swelling. This mode I adopt in a general way in my process for effecting the liquefaction. If we now maintain the starch-wort dissolved in the presence of the infusion which has served to liquefy it, the saccharification does not take place sensibly, even if we lower the temperature to 48° centigrade; but if after cooling we add a new portion of the infusion, the starch is rapidly transformed into dextrine and sugar. By diluting the wort with water until it contains only about eight to ten per cent. of starch we may attain complete and rapid saccharification with feeble doses of the infusion.

I will now describe my improved process, which is based upon the theory and principles hereinbefore set forth. I first prepare an infusion of malt, usually proceeding as follows: The malt is mixed with water and ground in a malt-mill, the proportions being usually about one hectoliter of water to ten kilograms of malt. This pulp is allowed to digest at about 30° centigrade for some hours, and is then passed through a fine sieve, such as is used in starch-making. The malt-liquid passes through the sieve and is caught in vessels, where the starch is allowed to settle. The clear liquid is the infusion of malt I employ for effecting the liquefaction and saccharification of the starch, and which I will hereinafter call, for convenience, simply the "infusion." I now take grain, either whole or coarsely crushed, and place it in a digester, which is then closed and a jet of steam admitted. This steam is allowed to condense and form a vacuum, after which water to steep the grain is admitted. This water has a temperature of from 40° to 50° centigrade, and the grain is allowed to steep *in vacuo* for about twenty-four hours. The grain, now swelled nearly to bursting, is removed to a suitable mill and ground to a fine pulp. This pulp is mixed in the proportion of from two to ten per cent. with water, and I then add to it from five to ten per cent. of the infusion. This mixture is poured into a suitable mixer and the temperature slowly raised while the mixture is being stirred, in order that it may heat uniformly. The temperature is thus raised to 80° centigrade, and is kept up for about an hour. The mass is now poured into a digester provided with a pugging apparatus and submitted to a temperature equal to a pressure of from one to two atmospheres for about half an hour. The liquefaction will now be completed and the wort is cooled down to 48° centigrade. I now add about twenty per cent. more of the infusion, and after an hour's time has been allowed for saccharification I proceed to filter the liquid. This filtration is effected by means of a lateral-feed filter-press wherein the ordinary filtering fabric is replaced by paper, which may be backed with textile material to impart strength. In order to remove all traces of gluten in the liquid, the latter may be subjected to further filtration. The wort is now concentrated, either in the open air or *in vacuo*, until it has, while still hot, a density of 28° Baumé. I now mix this sirup with a little paper-pulp and filter the mixture through a felt bag, after which the temperature is run up to 42° centigrade and the sirup filtered through bone-black. This may be effected in the ordinary closed and heated filters. The sirup is now put into casks to cool and is ready to be converted into sugar or a granulated mass.

In preparing my infusion of malt, described as the first in my process, in order to protect the infusion against alteration due to the rapid development of ferments, I employ water acidulated with hydrochloric, oxalic, or other acid sufficient to raise its acidity to $\frac{1}{2}°$ to 2° Gay-Lussac per liter, which is equivalent to seven to twenty-nine grams of commercial hydrochloric acid per hectoliter. This acidulation acts to prevent lactic and other fermentation and to neutralize any alkaline substances in the water used. These latter, even in small quantities, seriously hinder the diastasic fermentation. The measure of acidity above specified cannot be exceeded without injury to the liquefying and saccharifying agents in the infusion, and to employ less than the minimum dose of acid would not insure the infusion against alterations. I believe this proportion of acid or these limits for the dose to be essential to the industrial manufacture of maltose. I will here add that for the same reasons given above I acidulate the water mixed with the pulp from the steeped grain used in my process to the same extent as that used for the infusion of malt. The steeping of the grain *in vacuo* facilitates the entry of the water into the body of the grain, and also the thorough disaggregation of the latter without the aid of alkalies. These latter are to be carefully avoided in the manufacture of maltose.

I deem the filtration through paper in a filter-press also to be essential to the success of the manufacture of maltose industrially. The object of this filtration is to remove all germs of fermentation and cloudiness, which cannot be effected with the means ordinarily employed for filtering worts for other purposes.

The residue from the filtration, which still contains some starch and nitrogenous matter, may be used in the manufacture of sirups for brewing.

In making the infusion of malt I always employ, by preference, fresh germinated grain, or at least that dried at as low a temperature as possible. After separating the infusion from its residue, the latter may be employed for any purpose for which malt is ordinarily used, as it still contains some of the active principle of the grain.

I have described the method I employ when treating grain, and I will now describe the mode of operation where potatoes or other starchy tubers are treated. The potatoes are sliced, cooked at a temperature of 40° to 50° centigrade, or more, macerated to extract the soluble matters, salts, asparagine, &c., drained and reduced to a pulp. The after process is the same as that described for grain, except that for the liquefying agent I prefer to employ, in lieu of the infusion of malt, the residue of germinated grain left on the sieve in preparing the infusion. This residue may be mixed first with a suitable quantity of water and then with the potato pulp. This method is applicable to all amylaceous tubers.

In carrying out my process with grain I prefer to extract from it by washing from seven to ten per cent. of salts and gummy matters, if the object is to produce crystalline sugar, as these impede the crystallization of the maltose. The water containing the salts and gummy matters has a density of about 4° Baumé, and is capable of liquefying starch, and I employ it, by preference, in lieu of the infusion described, in the manufacture of sirups for brewing.

In the manufacture of sirups from maize, the wort, after liquefaction, is heated up to 110° centigrade in a digester for an hour, in order to dissolve the soluble matter of the grain. The wort is then cooled to 48° centigrade, and after saccharification, as described, the sirup is concentrated to from 33° to 40° and filtered, as before described.

The expense attending the use of bone-black for the final filtering or clarifying will be trifling, as it is only designed to remove the slight discoloration due to evaporation. Simply washing the hot black with a solution of soda, and then with hydrochloric acid, will revivify it.

The percentage of the infusion added to effect the saccharification of the liquefied starch may vary according to whether I wish to obtain a more or less rapid saccharification, and whether I wish to produce sirup only, or a stiff doughy mass. The proportion may vary from five to twenty per cent. To obtain a stiff mass from twelve to twenty per cent. of the infusion should be used, and the proportion of water used should be from ten to twelve times that of the starch, by weight. After the filtering of the saccharified wort through paper, as described, the wort may be placed in deep vessels with small mouths, and the saccharification prolonged before concentration, if desired, provided the temperature be maintained at about 48° centigrade. The wort may be thus preserved against alterations for about sixty hours.

The filtration of the concentrated sirup forms no essential part of my present application. I have merely described the filtration through felt and bone-black to illustrate how I usually proceed to clarify the sirup.

Having thus described my invention, I claim—

1. The herein-described process for the manufacture of maltose industrially which consists in first reducing the amylaceous material to a pulp, then mixing said pulp with water containing from five to ten per cent. of the infusion of malt, as described, then heating the mass gradually and slowly up to about 80° centigrade for about one hour, and then digesting the mass under a pressure of from one to two atmospheres for about half an hour, whereby the liquefaction of the starch is effected, as set forth.

2. The herein-described process for the manufacture of maltose industrially, which consists in adding to liquefied starch while at a temperature of about 48° centigrade from five to twenty per cent. of an infusion of malt, as described, then after about an hour has elapsed filtering the wort through paper, and then concentrating, substantially as set forth.

3. The herein-described process for the manufacture of maltose industrially, which consists in first reducing the amylaceous material to a pulp, then mixing said pulp with water and infusion of malt in substantially the proportions and at substantially the temperature specified, then heating the mass gradually up to 80° centigrade for about an hour, then digesting the mass under a pressure of from one to two atmospheres to effect the liquefaction of the starch, then adding to the liquefied starch the specified proportions of the infusion of malt while the temperature is maintained at about 48° centigrade, then allowing the wort to stand about an hour before effecting the saccharification, then filtering the saccharified wort through paper, and then concentrating, substantially as described.

In witness whereof I have hereunto signed my name in the presence of two subscribing witnesses.

LÉON CUISINIER.

Witnesses:
JULES ARMENGAUD, Jeune,
EDWARD P. MACLEAN.